US005430924A

United States Patent [19]

Rose

[11] Patent Number: 5,430,924

[45] Date of Patent: Jul. 11, 1995

[54] UPPER COUPLER TABLE AND METHOD FOR REMOVING AN UPPER COUPLER PLATE FROM A SEMITRAILER

[76] Inventor: Roger A. Rose, 27 Korby Rd., Esko, Minn. 55733

[21] Appl. No.: 167,526

[22] Filed: Dec. 14, 1993

[51] Int. Cl.⁶ .......................... B23P 19/04; B66F 7/08

[52] U.S. Cl. .................................. 29/426.5; 254/2 R

[58] Field of Search ............................ 29/426.3, 426.5; 254/2 R, 2 B, 2 C, 93 R, 98, 94, 418–423; 280/414.1, 475; 414/458; D34/31

[56] References Cited

U.S. PATENT DOCUMENTS

| | | | |
|---|---|---|---|
| 961,807 | 6/1910 | Seibert | 254/2 R |
| 1,981,271 | 11/1934 | Koenigkramer et al. | 254/2 R |
| 2,050,000 | 8/1936 | Frost | 254/2 R |
| 2,751,191 | 6/1956 | Schroeder | 254/2 R |
| 2,895,746 | 7/1959 | Swaney | 254/420 X |
| 2,998,960 | 9/1961 | Smith | 254/2 R |
| 3,554,394 | 1/1971 | Hedman | 280/414.1 X |
| 3,733,051 | 5/1973 | Bollinger | 254/94 |
| 3,830,468 | 8/1974 | Whitchurch et al. | 254/98 |
| 4,113,274 | 9/1978 | Vahrenkamp | 280/475 |
| 4,169,579 | 10/1979 | Moll | 254/420 X |
| 4,176,825 | 12/1979 | Schwebke | 254/94 |
| 4,934,893 | 6/1990 | Johnson | 414/458 |
| 5,139,102 | 8/1992 | Pocapalia | 254/93 R X |

FOREIGN PATENT DOCUMENTS

| | | | |
|---|---|---|---|
| 10455 | 5/1912 | United Kingdom | 254/2 R |
| 323921 | 1/1930 | United Kingdom | 254/2 R |
| 901255 | 1/1982 | U.S.S.R. | 254/2 R |

*Primary Examiner*—Peter Dungba Vo
*Attorney, Agent, or Firm*—Kinney & Lange

[57] ABSTRACT

An upper coupler table for facilitating the removal of an upper coupler plate from a semitrailer. The upper coupler table includes a support frame which supports a jack and a guide tube. A vertically adjustable center plate has a support tube attached thereto which extends through the guide tube. The jack contacts the support tube and can be operated to raise the center plate to a position where it can support the upper coupler plate while the upper coupler plate is detached from the semitrailer. After the upper coupler plate has been detached, the jack can be operated to lower the center plate until the upper coupler plate is supported on the support frame. The upper coupler table includes a plurality of casters attached to the support frame, allowing the table to be easily moved.

20 Claims, 2 Drawing Sheets

UPPER COUPLER TABLE AND METHOD FOR REMOVING AN UPPER COUPLER PLATE FROM A SEMITRAILER

BACKGROUND OF THE INVENTION

The present invention relates to a method and apparatus for facilitating the removal of an upper coupler plate from a semitrailer and, in particular, to an apparatus that can support the upper coupler plate during its removal. The apparatus allows a single person to remove an upper coupler plate from a semitrailer as well as move the plate to a separate work area.

An upper coupler plate is generally attached to the underside of a front end of a semitrailer and is used to couple a semitrailer to a tractor. As a safety precaution, upper coupler plates are required to be periodically inspected for cracks and other damage. The bottom of an upper coupler plate can be inspected while attached to the semitrailer. However, to perform a complete inspection, the upper coupler plate must be removed from the semitrailer so that the top of the plate can be inspected.

On many semitrailers, the upper coupler plate is removed by removing a plurality of bolts which fasten the plate to the underside of the semitrailer. While the bolts are being loosened and removed, the upper coupler plate must be supported. As most upper coupler plates weigh between 150 and 300 pounds, the process of removing the plate requires the efforts of more than one person. Once the bolts have been removed, the upper coupler plate is manually lowered and carried to a work area for inspection.

Because of the current labor-intensive nature of the process of removing an upper coupler plate from a semitrailer, there exists a need for an apparatus to facilitate the removal of the upper coupler plate. It would be desirable for such an apparatus to allow the upper coupler plate to be removed by a single person. It would also be beneficial if such an apparatus allowed the upper coupler plate to be easily moved to a work area for inspection after it has been removed.

SUMMARY OF THE INVENTION

The present invention provides an upper coupler table for facilitating the removal of an upper coupler plate from a semitrailer. The upper coupler table allows a single person to remove the upper coupler plate and comprises a support frame, a jack, a plate assembly and a guide assembly.

The support frame supports both the jack and the guide assembly and comprises four generally parallel legs joined together by a plurality of transverse beams. A lower support beam extends between two lower transverse beams and is used to support the jack. The guide assembly comprises a guide tube which is attached to the legs of the support frame by a plurality of radially extending supports. The guide tube is held by the supports in a position generally parallel to and equidistant from each of the legs.

The plate assembly includes a center plate for engaging the upper coupler plate and a support tube extending from the center of a bottom side of the center plate. The plate assembly is positioned so that the support tube extends through the guide tube and a closed lower end of the support tube contacts the jack. The center plate has a size thin permits it to pass through an open upper end of the support frame.

To remove an upper coupler plate from a semitrailer, the upper coupler table is positioned beneath the upper coupler plate. The jack is then operated to raise the support tube and center plate so that the center plate contacts the upper coupler plate. The bolts fastening the upper coupler plate to the semitrailer can then be removed while the upper coupler plate is supported by the center plate. Once the bolts are removed, the jack is operated to lower the center plate until it passes below the upper end of the support frame. The upper coupler plate is lowered with the center plate until it reaches the upper end of the support frame, where it is then supported.

A caster is attached to a lower end of each of the legs, allowing the entire upper coupler table to be easily moved from underneath the semitrailer. This allows for an easier inspection of the upper coupler plate after it has been removed. By supporting the upper coupler plate throughout the process of its removal from the semitrailer, the upper coupler table allows one person to perform the entire task.

DETAILED DESCRIPTION OF THE PREFERRED EMBODIMENTS

Figure 1:
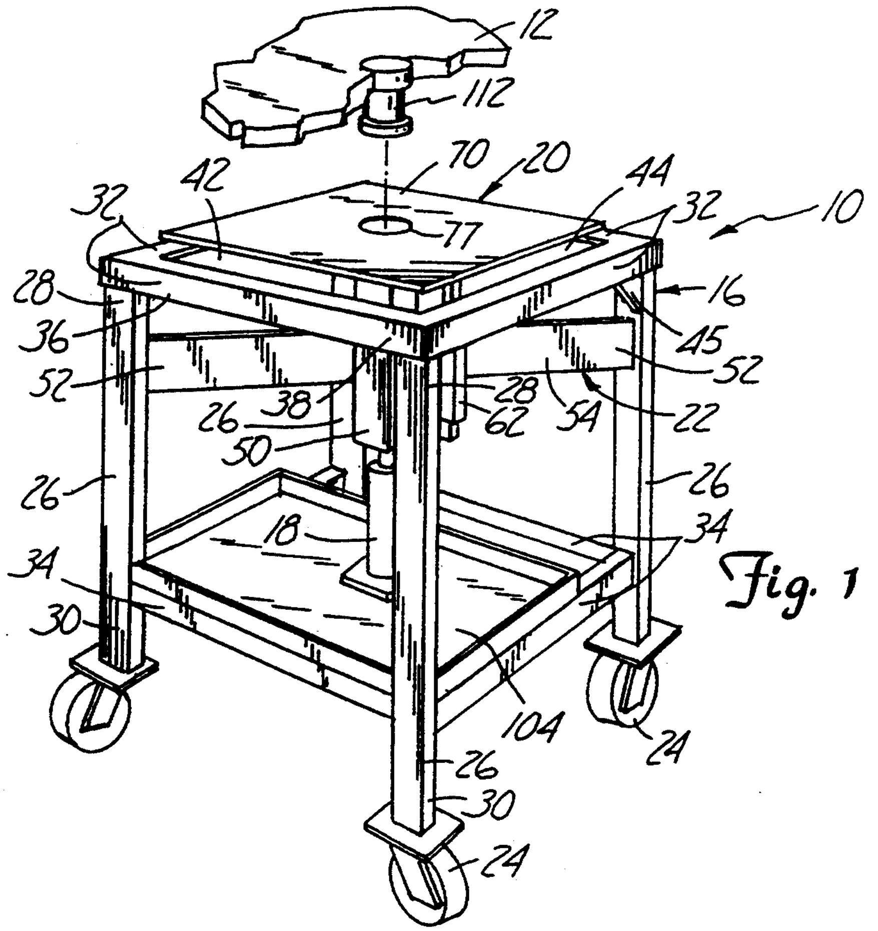
FIG. 1 is a perspective view of the upper coupler table of the present invention positioned under an upper coupler plate.

An upper coupler table 10 of the present invention is shown in FIG. 1 positioned beneath an upper coupler plate 12 of a semitrailer. The upper coupler table 10 comprises a support frame 16, a hydraulic jack 18, a plate assembly 20, a guide assembly 22 and a plurality of casters 24.

The support frame 16 comprises four tubular legs 26, each of which has an upper end 28 and a lower end 30. The legs 26, which are generally parallel to each other, are joined together by four upper transverse beams 32 and four lower transverse beams 34. A first end 36 of each upper transverse beam 32 is attached to the upper end 28 of one of the legs 26 while a second end 38 of each upper transverse beam 32 is attached to the upper end 28 of an adjacent leg 26. The four upper transverse beams 32 thus define a generally rectangular opening 42 at an upper end 44 of the support frame 16. A plurality of corner supports 45 help support the upper transverse beams 32.

Figure 2:
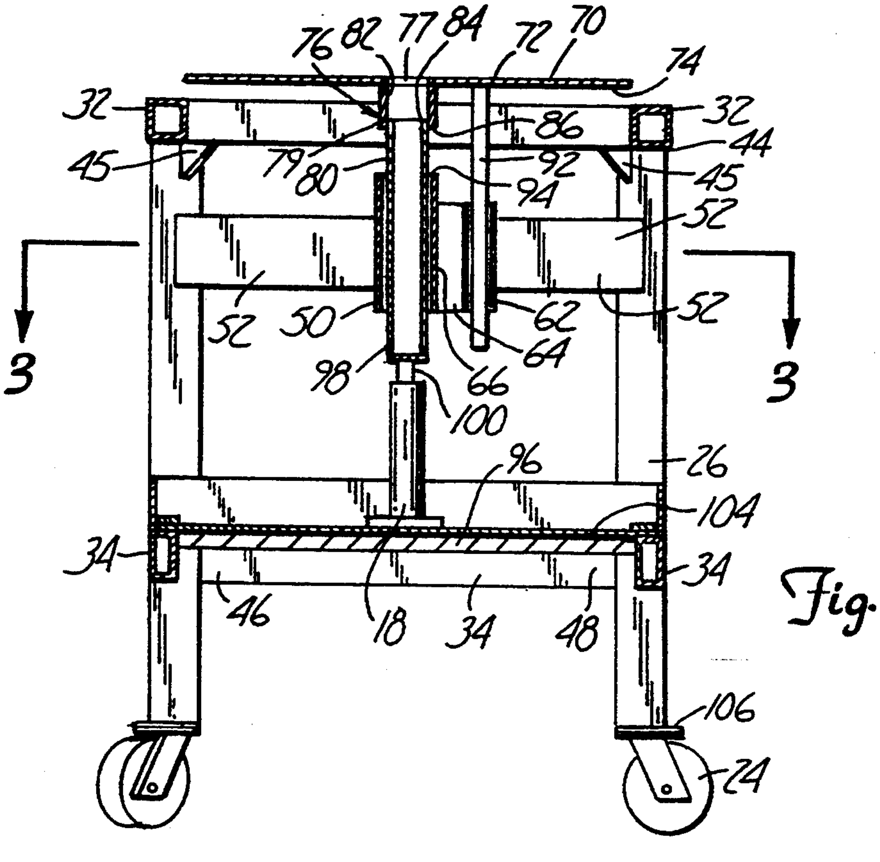
FIG. 2 is a sectional view of the upper coupler table of the present invention taken along the line 2—2 of FIG. 3.

As shown in FIG. 2, a first end 46 of each lower transverse beam 34 is attached to one of the legs 26 at a point along the length of the leg 26 while a second end 48 is attached to an adjacent leg 26 at an equivalent point along the length the adjacent leg 26. The lower transverse beams 34, each of which has a generally tubular construction, help provide stability for the support frame 16.

Figure 3:
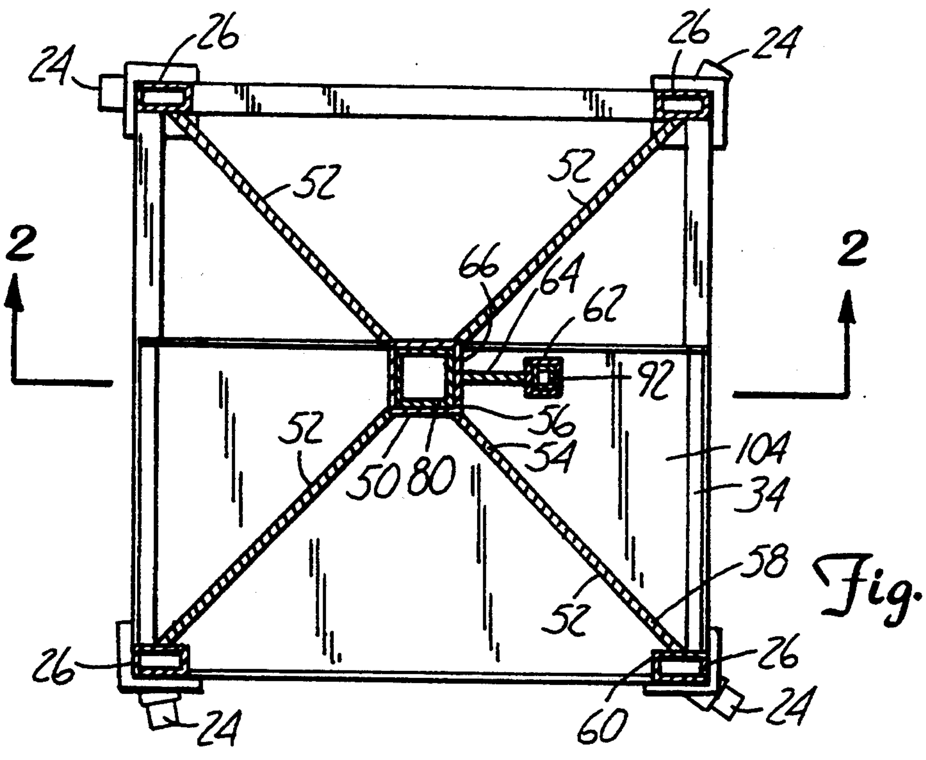
FIG. 3 is a sectional view of the upper coupler table of the present invention taken along the line 3—3 of FIG. 2.

The guide assembly 22 comprises a guide tube 50 and four guide tube supports 52 which radially extend from the guide tube 50 as shown in FIG. 3. Each guide tube support 52 is approximately the same length and has a first end 54 attached to an outer corner 56 of the guide tube 50 and a second end 58 attached to a facing corner 60 of one of the legs 26. The guide tube supports 52 thus hold the guide tube 50 generally parallel to and centered between the legs 26. A secondary guide tube 62 is held spaced from and generally parallel to the guide tube 50 by a secondary support 64 which extends between a first side 66 of the guide tube 50 and the secondary guide tube 62.

The plate assembly 20 includes a center plate 70 having a top side 72 for engaging the upper coupler plate 12, a bottom side 74 and an opening 77 therethrough at its center. A support tube 76, extends downward from and is rigidly attached to the bottom side 74 of the center plate 70. The support tube 76 comprises a generally cylindrical upper section 79 and a lower section 80. An open upper end 82 of the upper section 79 is attached to the bottom side 74 of the center plate 70 such that the upper end 82 aligns with the opening 77 while an upper end 84 of the lower section 80 is rigidly attached to a lower end 86 of the upper section 79. A guide rod 92 is rigidly attached to the bottom side 74 of the center plate 70 and extends from the center plate 70 in a direction generally parallel to the support tube 76.

The guide assembly 22 holds the plate assembly 20 in a fixed horizontal position with respect to the support frame 16 as the lower section 80 of the support tube 76 extends through the guide tube 50 and the guide rod 92 extends through the secondary guide tube 62. The guide assembly 22 also allows the plate assembly 20 to be vertically adjusted as the support tube 76 can move both upward and downward within the guide tube 50. However, the downward movement of the support tube 76 is limited by contact between the lower end 86 of the upper section 79 and an upper end 94 of the guide tube 50. Both the guide tube 50 and the lower section 80 of the support tube 76 have a generally rectangular cross-section to prevent the center plate 70 from rotating with respect to the support frame 16. The center plate 70 is also prevented from rotating through the use of the guide rod 92 and the secondary guide tube 62.

A lower support 96 extends between two oppositely situated lower transverse beams 34 so that it passes beneath a lower end 98 of the lower section 80 of the support tube 76. The lower support 96 is used to support the hydraulic jack 18 which is bolted to the lower support 96 in a position directly beneath the lower end 98 of the lower section 80. An extendible portion 100 of the jack 18 is positioned so that it contacts the lower end 98 of the lower section 80 and is sized such that it can extend into the guide tube 50. A tool tray 104 rests on and is attached to three of the lower transverse beams 34 as well as the lower support 96. The tray 104 helps support the jack 18 and can be used to hold tools, bolts and a variety of other items.

Each of the casters 24 is attached to the lower end 30 of one of the legs 26 through the use of a caster plate 106. The caster plate 106 is welded to the lower end 30 of the leg 26 and is held to the caster 24 through the use of a plurality of bolts, each of which extends through both the caster plate 106 and a portion of the caster 24. Due to the large weight of the upper coupler plate 12, the casters 24 must be heavy duty casters able to support large loads.

To remove the upper coupler plate 12 from the semitrailer, the upper coupler table 10 is positioned beneath the upper coupler plate 12 so that the opening 77 in the center plate 70 is aligned with a coupling pin 112 which extends downward from the upper coupler plate 12. Once the table 10 is properly positioned, the hydraulic jack 18 is operated so that the extendible portion 100 pushes the support tube 76 upward through the guide tube 50, thereby raising the center plate 70 which passes through the opening 42 in the upper end 44 of the support frame 16. The center plate 70 is raised until the top side 72 of the center plate 70 contacts the upper coupler plate 12 and the coupling pin 112 extends through the opening 77.

Once the center plate 70 is in contact with the upper coupler plate 12, the bolts holding the upper coupler plate 12 to the semitrailer can be loosened and removed as the center plate 70 will support the upper coupler plate 12. When the bolts are removed, the hydraulic jack 18 is operated to slowly lower the support tube 76 and the center plate 70 until the center plate 70 passes through the opening 42 in the upper end 44 of the support frame 16. Then, with the upper coupler plate 12 resting on the upper transverse beams 32, the upper coupler table 10 can be moved to a separate work area for inspection of the upper coupler plate 12.

To reattach the upper coupler plate 12 after inspection, the upper coupler table 10 is positioned beneath the semitrailer and the hydraulic jack 18 is operated to raise the center plate 70. When the center plate 70 passes through the opening 42 in the upper end 44 of the support frame 16, it begins to raise the upper coupler plate 12 into a position where it can be reattached to the semitrailer using the bolts previously removed. After the upper coupler plate 12 has been reattached, the center plate 70 is lowered and the upper coupler table 10 can be removed.

Each of the elements of the support frame 16 are welded together to provide a stable frame capable of supporting large loads. Although a hydraulic jack 18 is described as being used to lift the center plate 70, the center plate 70 may be lifted in a variety of other ways such as through the use of a mechanical jack. The upper coupler table 10 of the present invention enables a single user to remove an upper coupler plate from a semitrailer. This has great benefit in that inspections of an upper coupler plate 12 can now be more quickly and efficiently performed.

Although the present invention has been described with reference to preferred embodiments, workers skilled in the art will recognize that changes may be made in form and detail without departing from the spirit and scope of the invention.

What is claimed is:

1. An apparatus for facilitating the removal of an upper coupler plate from a semitrailer, the apparatus comprising:

vertically adjustable engaging means for engaging and supporting the upper coupler plate; and support means for supporting the engaging means, the support means having an upper end defining an opening for moving said vertically adjustable engaging means therethrough, wherein the upper coupler plate being supported at the upper end of the support means when the engaging means is positioned below the upper end of the support means.

2. The apparatus of claim 1 wherein the apparatus includes lift means for adjusting the vertical position of the engaging means.

3. The apparatus of claim 2 wherein the engaging means comprises a plate having a top side and a bottom side.

4. The apparatus of claim 3 wherein the support means includes a support frame comprising a plurality of parallel, vertically extending legs and a plurality of transverse beams joining the legs.

5. The apparatus of claim 4 wherein each of the transverse beams has a first end attached to an upper end of one of the legs and a second end attached to an upper end of an adjacent leg such that the transverse beams define the opening in the upper end of the support frame.

6. The apparatus of claim 5 wherein each leg has a caster attached thereto at a lower end.

7. The apparatus of claim 5 wherein the apparatus includes a tray attached to the support frame below the upper end.

8. The apparatus of claim 3 wherein the engaging means further comprises a support tube having an upper end attached to the bottom side of the plate.

9. The apparatus of claim 8 wherein the apparatus includes a generally vertically extending guide tube attached to the support means by a plurality of guide tube supports.

10. The apparatus of claim 9 wherein the support tube extends through the guide tube.

11. The apparatus of claim 10 wherein the support tube and the guide tube each have a cross-section having the general shape of a rectangle.

12. The apparatus of claim 10 wherein the lift means contacts a lower end of the support tube.

13. The apparatus of claim 12 wherein the support means supports the lift means.

14. The apparatus of claim 13 wherein the lift means comprises a hydraulic jack.

15. An apparatus for facilitating the removal of an upper coupler plate from a semitrailer, the apparatus comprising:

a vertically adjustable plate for engaging the upper coupler plate, the vertically adjustable plate having a top side and a bottom side;

a support frame for supporting the vertically adjustable plate, the support frame having a plurality of generally parallel, vertically extending legs and a plurality of transverse beams joining the legs, the transverse beams defining an open upper end of the support frame for moving said vertically adjustable engaging means therethrough.

16. The apparatus of claim 15 wherein the apparatus includes a support tube having an upper end attached to the bottom side of the vertically adjustable plate.

17. The apparatus of claim 16 wherein the apparatus includes a generally vertically extending guide tube attached to the support frame by a plurality of guide tube supports, and wherein the support tube extends through the guide tube.

18. The apparatus of claim 15 wherein the apparatus includes a jack for adjusting the vertical position of the vertically adjustable plate.

19. A method for removing an upper coupler plate from a semitrailer, the method comprising the steps of:

positioning an apparatus comprising a vertically adjustable plate for engaging the upper coupler plate and a support frame for supporting the vertically adjustable plate, the support frame having an upper end defining an opening for moving said vertically adjustable engaging means therethrough under the semitrailer so that the vertically adjustable plate is located beneath the upper coupler plate;

adjusting the vertical position of the vertically adjustable plate so that it contacts the upper coupler plate; and detaching the upper coupler plate from the semitrailer.

20. The method of claim 19 wherein the method includes the additional step of lowering the vertically adjustable plate to a position below the upper end of the support frame such that the upper coupler plate contacts the upper end of the support frame.

* * * * *